Figure 1:
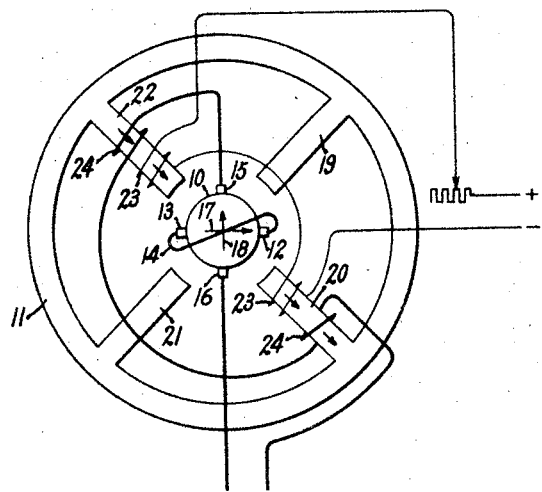

Jan. 12, 1943.  W. R. GOSS ET AL  2,308,279
DYNAMO-ELECTRIC MACHINE
Filed Nov. 27, 1941

Inventors:
Wesley R. Goss,
Ray D. Jones,
by *Harry E. Dunham*
Their Attorney.

UNITED STATES PATENT OFFICE 2,308,279

DYNAMOELECTRIC MACHINE

Wesley E. Goss and Ray D. Jones, Fort Wayne, Ind., assignors to General Electric Company, a corporation of New York Application November 27, 1941, Serial No. 420,650

6 Claims. (Cl. 171—223)

This invention relates to direct current commutator type dynamo-electric machines wherein the armature reaction of the machine provides a source of excitation thereto.

A direct current machine of the armature reaction excitation type is a dynamo-electric machine which may be operated as a motor, a generator, or a rotary transformer and is provided with a rotor or armature having a winding and a commutator of the conventional direct current dynamo-electric machine type. The stationary member or other relatively rotatable member of such a machine usually is arranged to provide a path of low magnetic reluctance to the magnetic flux set up by the armature currents and may be provided with various windings to improve or control the operation of the machine. The basic principle of operation of this machine is similar to that of a Rosenberg generator in that it depends upon armature reaction flux produced by current flowing between two sets of brushes for providing the desired characteristics of the machine. By providing special stator field exciting windings, this type dynamo-electric machine may be made to provide a controllable variable voltage and variable current characteristic with a very high rate of response and high amplification ratio. In order to obtain this high amplification ratio and low time constant, the stator is provided with a main control winding and another field exciting winding is arranged to neutralize or compensate for the armature reaction produced by the load or secondary current of the machine. The compensating winding of these machines usually is arranged about all of the pole pieces or distributed on both sides of the secondary brushes so as to have substantially no effect on the primary component of armature reaction, but in order to obtain this result, a component of the magnetomotive force is produced by the compensating winding to assist the primary armature reaction and to compensate or counter-balance a component of the compensating magnetomotive force which opposes the primary component of armature reaction. In order to provide these counter-balanced components of compensating field exciting winding magnetomotive force, a certain number of ampere turns is required which have no beneficial effect and merely increase the losses of the machine and decrease its efficiency.

An object of our invention is to provide an improved dynamo-electric machine of the armature reaction excitation type having high amplification and quick response characteristics.

Another object of our invention is to improve the efficiency of an armature reaction excitation type dynamo-electric machine.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 2:
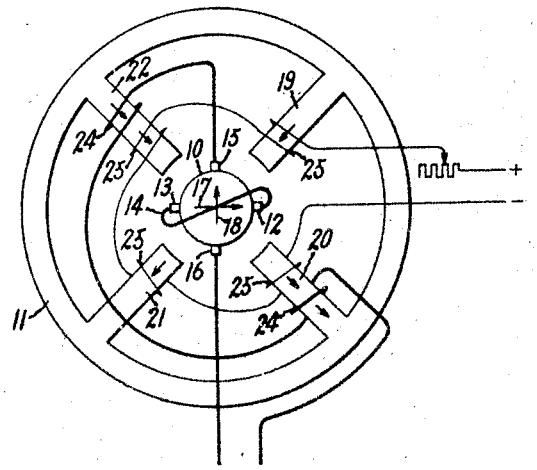
Figure 3:
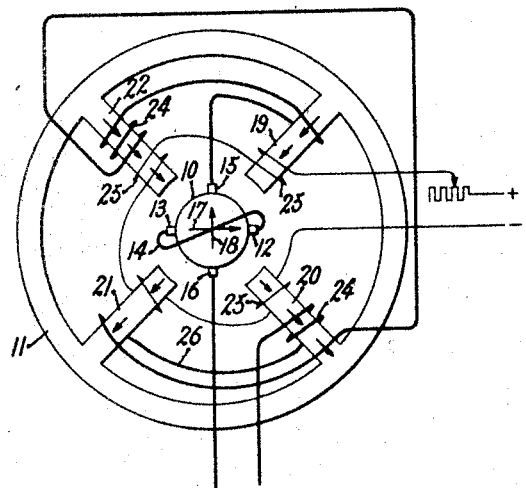

In the accompanying drawing, Fig. 1 is a diagrammatic illustration of a dynamo-electric machine embodying our improved field exciting winding arrangement; Fig. 2 is a modification of the arrangement shown in Fig. 1 having a different control field exciting winding arrangement; and Fig. 3 is a further modification similar to Fig. 2 and provided with a series compensating field exciting winding arranged partly about all of the pole pieces of the machine.

Referring to the drawing, we have shown an armature reaction excited dynamo-electric machine arranged as a generator provided with a rotatable member or armature 10 having a commutator connected to an armature winding of the conventional direct current type and adapted to be driven by any suitable source of mechanical power. For illustrative purposes, the machine is shown as having a two-pole excitation system, and each pole includes two pole pieces mounted on a stationary or relatively rotatable magnet frame member 11. With this type excitation system, the armature is provided with a set of primary brushes 12 and 13 which are connected together by a short-circuiting conductor 14 to provide a primary circuit through the armature 10. A set of secondary brushes 15 and 16 also contacts the commutator of the armature 10 and is electrically displaced about the commutator from the primary brushes 12 and 13 and provides a secondary circuit through the armature 10. In order to obtain a substantially balanced distribution of electric currents through the various parts of the armature, the secondary brushes 15 and 16 are displaced substantially 90 electrical degrees from the primary brushes 12 and 13. Since the primary brushes 12 and 13 are short circuited, a very small amount of flux is required to induce a voltage between these brushes to build up a relatively large primary current through that part of the armature winding which is connected between these brushes. This primary current will produce a magnetic flux or a primary armature reaction along the primary axis, as indicated by the arrow 17. As the armature 10 rotates, the conductors which are connected to the secondary brushes 15 and 16 will cut the primary armature reaction flux and a voltage will be induced between these brushes. If these brushes be connected to a load, a secondary or load current will flow through the secondary circuit in the armature and produce a secondary armature reaction along the axis of these brushes, as indicated by the arrow 18 in the drawing.

In order to control the secondary or load characteristics of the generator, the stationary member of the machine is provided with split or divided poles which may be formed by salient pole pieces 19, 20, 21, and 22 arranged intermediate the primary and secondary brushes as shown in all of the figures of the drawing. A control field exciting winding 23 is arranged to provide a component of magnetic excitation along the secondary commutating axis of the machine in opposition to the secondary armature reaction 18, and in the illustrated arrangement, this winding is arranged on the pole pieces 20 and 22, such that a component of excitation also is produced by this winding along the primary commutating axis in the same direction as the primary armature reaction 17, thereby producing a compounding effect with the primary armature reaction and not producing any component of excitation opposed to the primary armature reaction. This increases the efficiency of the machine by reducing the number of ampere turns required to provide a desired magnetomotive force, as the control field exciting winding 23 is not arranged to provide any component of excitation opposed to the primary armature reaction. Furthermore, the efficiency of the machine is increased due to the reduction in the mean length of turn as the control field exciting winding 23 is only arranged about one of the pole pieces comprising each secondary pole. The excitation of this winding is indicated by arrows in the drawing. A series field exciting winding 24 is arranged on the pole pieces 20 and 22 and is connected in series with the secondary armature circuit to provide a component of magnetic excitation responsive to electric current in the armature secondary circuit in opposition to the secondary armature reaction 18. It is desirable that this component should be substantially equal and opposite to the secondary armature reaction 18 in order to minimize the excitation which the control field exciting winding 23 must provide. This series compensating field exciting winding 24 also provides a component of magnetic excitation in the same direction as the primary armature reaction 17 and produces a compounding action therewith, thereby reducing the primary short-circuited current in the armature necessary to produce a desired secondary voltage. This excitation is indicated by arrows in the drawing. Furthermore, the field exciting winding 24 is only arranged on the pole pieces 20 and 22 which comprise those parts of the secondary poles which do not require that the series compensating field exciting winding produce a component of excitation in opposition to the primary armature reaction. Thus, the number of ampere turns required to produce a desired compensating effect is minimized by eliminating the unnecessary ampere turns used to balance out the magnetomotive force which would be opposed to the primary armature reaction if the compensating winding were arranged about all of the parts of all of the poles. This also reduces the mean length of turn of the compensating field exciting winding in a manner similar to that of the control field exciting winding and further reduces the losses and increases the efficiency of the machine. This provides a machine having two relatively rotatable members, both of which are arranged to provide some component of magnetic excitation to the machine. In this arrangement, no field exciting windings are arranged on the pole pieces 19 and 21, and these pole pieces are adapted to provide a low reluctance path for the various fluxes set up in the machine.

Fig. 2 illustrates a modification of the arrangement shown in Fig. 1 wherein the armature or rotatable member 10 and the series compensating winding 24 are substantially the same as those in Fig. 1 and operate in a similar manner. In this arrangement, the control of the machine is obtained by providing a field exciting winding 25 distributed on all of the parts of the different poles, such that the net control flux is along the secondary commutating axis of the machine in opposition to the secondary armature reaction 18. Such a control field exciting winding arrangement may be desirable in certain instances to provide a more balanced distribution of the magnetic fluxes, and the efficiency of the machine in such an arrangement also is substantially increased over the conventional machine by the improved arrangement of the compensating winding 24. The direction of the magnetomotive force of all of these windings is indicated by arrows in the drawing.

Fig. 3 illustrates a further modification of my improved machine wherein the armature 10 and the control field exciting winding 25 are arranged in substantially the same manner as in Fig. 2. In this construction, the series compensating field exciting winding is provided with a portion 26 about all of the pole pieces as in the conventional machine, and is provided, in addition, with a portion 24 similar to the compensating field exciting windings 24 in Figs. 1 and 2. The series field exciting winding portion 24 provides not only a compensating component of excitation, but also a cumulative compounding component of excitation in the same direction as the primary armature reaction 17, as explained with respect to Figs. 1 and 2. The direction of the magnetomotive forces of all of these windings is indicated by arrows in the drawing, and the arrangement of the portion 24 of the compensating field exciting winding increases the efficiency of the machine over a conventional construction by reducing a part of the mean length of turn of the compensating field exciting winding and by providing a portion of the primary armature excitation, thereby reducing the primary short-circuit armature current.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. A dynamo-electric machine having a stationary member and a rotatable member provided with a winding and a commutator connected thereto, means including a commutator primary brush set and a commutator secondary brush set displaced from said primary brush set for providing a primary circuit and a secondary circuit respectively through said rotatable member adapted to provide a primary and a secondary component of armature reaction magnetic excitation respectively to said machine, pole pieces on said stationary member arranged intermediate said primary and secondary brushes, and a field exciting winding arranged on one of said pole pieces to provide a component of magnetic excitation responsive to electric current in said armature secondary circuit and in opposition to the secondary component of armature reaction and no component in opposition to the primary component of armature reaction.

2. A dynamo-electric machine having a pair of relatively rotatable members, one of said members being provided with a winding and a commutator connected thereto, means including a commutator primary brush set and a commutator secondary brush set displaced about said commutator from said primary brush set for providing a primary circuit and a secondary circuit respectively through said one member arranged to provide a primary and a secondary component of armature reaction magnetic excitation respectively to said machine, pole pieces on said stationary member arranged intermediate said primary and secondary brushes, means including a field exciting winding arranged on said pole pieces for providing a component of magnetic excitation responsive to electric current in said armature secondary circuit in opposition to the secondary component of armature reaction and not in opposition to the primary component of armature reaction, and means including a second field exciting winding for providing a control component of magnetic excitation to said machine in substantially the same direction as said first-mentioned field exciting winding.

3. A dynamo-electric machine having a pair of relatively rotatable members, one of said members being provided with a winding and a commutator connected thereto, means including a commutator primary brush set and a commutator secondary brush set displaced about said commutator from said primary brush set for providing a primary circuit and a secondary circuit respectively through said one member arranged to provide a primary and a secondary component of armature reaction magnetic excitation respectively to said machine, and means including a field exciting winding arranged to provide a component of magnetic excitation responsive to current in said armature secondary circuit with a component in opposition to the secondary component of armature reaction and a component in the same direction as the primary component of armature reaction without any component opposed to the primary armature reaction.

4. A dynamo-electric machine having a pair of relatively rotatable members, one of said members being provided with a winding and a commutator connected thereto, means including a commutator primary brush set and a commutator secondary brush set displaced about said commutator from said primary brush set for providing a primary circuit and a secondary circuit respectively through said one member arranged to provide a primary and a secondary component of armature reaction magnetic excitation respectively to said machine, means including a field exciting winding for providing a component of magnetic excitation responsive to electric current in said armature secondary circuit in opposition to the secondary component of armature reaction and a compounding component of excitation in the same direction as the primary component of armature reaction, at least a part of said field exciting winding providing a component of excitation in the same direction as the primary armature reaction without a corresponding component in opposition thereto, and means including a second field exciting winding for providing a control component of magnetic excitation to said machine in opposition to the secondary armature reaction.

5. A dynamo-electric machine having a pair of relatively rotatable members, one of said members being provided with a winding and a commutator connected thereto, means including a commutator primary brush set and a commutator secondary brush set displaced about said commutator from said primary brush set for providing a primary circuit and a secondary circuit respectively through said one member arranged to provide a primary and a secondary component of armature reaction magnetic excitation respectively to said machine, said other member having an excitation system of magnetic material forming divided poles, portions of said divided poles on each side of said primary and said secondary brushes respectively forming primary and secondary poles for the primary and secondary armature reactions, means including a field exciting winding arranged on a portion of each of said poles 180 electrical degrees apart for providing a component of magnetic excitation responsive to electric current in said armature secondary circuit and in opposition to the secondary component of armature reaction and not in opposition to the primary component of armature reaction, and means including a second field exciting winding arranged on the same portions of said poles as said first-mentioned field exciting winding for providing a control component of magnetic excitation to said machine in substantially the same direction as said first-mentioned field exciting winding.

6. A dynamo-electric machine having a pair of relatively rotatable members, one of said members being provided with a winding and a commutator connected thereto, means including a commutator primary brush set and a commutator secondary brush set displaced about said commutator from said primary brush set for providing a primary circuit and a secondary circuit respectively through said one member arranged to provide a primary and a secondary component of armature reaction magnetic excitation respectively to said machine, said other member having an excitation system of magnetic material forming divided poles, portions of said divided poles on each side of said primary and said secondary brushes respectively forming primary and secondary poles for the primary and secondary armature reactions, means including a field exciting winding arranged on a portion of each of said poles 180 electrical degrees apart for providing a component of magnetic excitation responsive to electric current in said armature secondary circuit and in opposition to the secondary component of armature reaction and not in opposition to the primary component of armature reaction, means including a second field exciting winding arranged in the same portions of said poles as said first-mentioned field exciting winding for providing a control component of magnetic excitation to said machine in substantially the same direction as said first-mentioned field exciting winding, and means including a third field exciting winding arranged on all portions of said poles for providing a component of magnetic excitation responsive to electric current in said armature secondary circuit and in opposition to said secondary component of armature reaction.

WESLEY R. GOSS.
RAY D. JONES.